United States Patent Office 2,768,170
Patented Oct. 23, 1956

2,768,170

PRODUCTION OF DYESTUFFS OF THE PHTHALOCYANINE SERIES

Fritz Muehlbauer, Ludwigshafen (Rhine), Germany, assignor to Badische Anilin- & Soda-Fabrik Aktiengesellschaft, Ludwigshafen (Rhine), Germany No Drawing. Application March 29, 1952,
Serial No. 279,465

Claims priority, application Germany April 5, 1951

9 Claims. (Cl. 260—314.5)

This invention relates to sulfur-containing dyestuffs of the heavy metal phthalocyanine series and a process of producing same.

I have found that sulfur-containing dyestuffs of the phthalocyanine series are obtained by heating aliphatic or/and aromatic vicinal dinitriles, cyanocarboxylic acid amides or dicarboxylic acid diamides with sulfur and finely divided metals or simple or complex metal compounds, if desired in the presence of an inert diluent or solvent, such as sodium chloride or sodium sulfate. The reaction temperatures range between 150 and 220° C., the best results are obtained at from 180 to 200° C.

Suitable initial materials are for example simple or substituted maleic acid dinitriles, such as diphenylmaleic acid dinitrile, and also ortho-dinitriles of the benzene and naphthalene series, in particular phthalodinitrile and orthocyanobenzamide, as well as their substitution products, as for example monochlorophthalodinitrile, orthocarboxylic acid diamides, such as phthalic acid diamide, or ortho-dinitriles of the heterocyclic series may however also be used for the reaction. For the phthalocyanine formation there may be used either finely divided metals or their anhydrous halides, cyanides, thiocyanates, sulfates, carbonates, oxides, sulfides or acetates. Metal salts, the corresponding metal phthalocyanines of which are capable of adding on halogens and/or amines, such as the salts of iron, chromium, tin, aluminum, zinc and in particular cobalt, are especially suitable for the process. Instead of the simple salts, there may also be used metal complex salts, as for example with amines or alcohols, such as tetrapyridine cobalto chloride or pentamine chloro cobalt chloride.

The amount of sulfur may vary within wide limits. Even when employing relatively small amounts, as for example, 1 atomic proportion of sulfur to 4 molecular proportions of phthalocyanine-forming compounds, dyestuffs are obtained which dye after the nature of vat dyestuffs or sulfur dyestuffs. As the amount of sulfur is increased, the tinctorial properties of the new compounds generally speaking improve but it is not recommended that more than 24 atoms of sulfur should be used for 4 molecular proportions of phthalocyanine-forming compounds for it has been found that a maximum of only 1 to 2 atoms of sulfur enter into the resulting dyestuff molecule. In the case of dyestuffs having a sulfur content of less than 1 atom of sulfur per dyestuff molecule, it must be assumed that in the presence of the sulfur-containing portion of the dyestuff the non-sulfur-containing portion of the dyestuff also co-vats under reducing conditions. Vatting with sodium hyposulfite usually takes place even at room temperature and vegetable and some synthetic fibres are dyed from the resulting deep-colored vat solutions in powerful blue to blue-green or also olive-green shades having very good fastness properties. Some of the resulting dyestuffs, in particular the sulfur-containing cobalt phthalocyanines, are typical "sulfur dyestuffs" which yield deep-colored solutions with sodium sulfide alone from which natural or synthetic fibres are dyed greenish-blue shades which are fast to light.

The following examples will further illustrate this invention but the invention is not restricted to these examples. The parts are by weight.

Example 1

An intimate mixture of 51 parts of phthalodinitrile, 15 parts of anhydrous cobalt chloride and 9.6 parts of sulfur powder is heated at 180° to 200° C. until the formation of dyestuff is completed. The crude dyestuff is then comminuted, boiled first with dilute caustic soda solution and then, after filtration by suction and washing, with dilute hydrochloric acid, again washed well and dried. 40 to 45 parts of a dark-blue powder are obtained which can be very easily vatted in alkaline sodium hyposulphite solution even at room temperature; from this vat vegetable or synthetic fibres suitable for vat dyeing are dyed powerful greenish-blue shades.

The dyestuff can be brought into solution with sodium sulfide, instead of with sodium hyposulphite, and fibres may be dyed with this solution in the same way as with sulfur dyestuffs.

The analysis of the dyestuff which has been well purified and then extracted with carbon disulfide shows that it contains 1 atom of sulfur to each molecule of cobalt phthalocyanine.

Example 2

A mixture of 5.8 parts of ortho-cyanobenzamide, 1.5 parts of anhydrous cobalt chloride, 1.0 part of sulfur and 0.05 part of ammonium molybdate is heated at 180° to 200° C. until the formation of dyestuff is completed. After comminution and alternate purification of the reaction product with dilute caustic soda solution and hydrochloric acid, about 3 parts of a blue dyestuff are obtained which has the same properties as that obtained according to Example 1.

Phthalic acid diamide may be used instead of ortho-cyanobenzamide with the same result.

Example 3

51 parts of phthalodinitrile, 15 parts of anhydrous cobalt chloride, 6.4 parts of sulfur and 150 parts of rock salt or anhydrous sodium sulfate are ground in a ball mill until they are homogeneously mixed. The mixture is then heated at 180° to 200° C. until the formation of dyestuff is completed. After purification of the crude product in the manner described in Examples 1 and 2, about 45 parts of a blue dyestuff powder are obtained with which vegetable or suitable synthetic fibres can be dyed greenish-blue shades according to the dyeing prescriptions for vat or sulfur dyestuffs. The dyestuff itself contains 1 atom of sulfur to each molecule of cobalt phthalocyanine.

Example 4

An intimate mixture of 51 parts of phthalodinitrile, 19 parts of sublimed ferric chloride and 12 parts of sulfur, prepared in a ball mill, is heated to 180° to 200° C. until the formation of dyestuff is completed. After conventional purification, 47 parts of a dark-blue dyestuff powder are obtained with which vegetable and suitable synthetic fibres can be dyed powerful olive-green shades in the same way as with vat or sulfur dyestuffs.

Example 5

51 parts of phthalodinitrile, 44 parts of tetrapyridino cobalto chloride and 6.4 parts of sulfur are intimately mixed with each other and the mixture then heated at 180° to 220° C. until the formation of dyestuff is completed. The crude dyestuff is comminuted, boiled alternately with dilute caustic soda solution and dilute hydrochloric acid, filtered by suction, washed and dried. 40 to 45 parts of a dark-blue dyestuff powder are obtained which has the same tinctorial properties as the dyestuffs obtained according to Examples 1, 2 and 3.

*Example 6*

An intimate mixture of 51 parts of phthalodinitrile, 6 parts of finely dispersed cobalt, 10 parts of powdery sulfur and 0.5 part of ammonium molybdate is heated to from 180 to 200° C. until the formation of dyestuff is completed. The crude dyestuff thus obtained is comminuted, boiled first with dilute hydrochloric acid and then with dilute caustic soda solution. The remaining dyestuff is filtered off by suction and the nutsch cake washed with water and dried. There are obtained about 45 parts of dark-blue dyestuff powder which may be vatted by an alkaline sodium hyposulphite solution or a sodium sulfide solution. From this vat cotton is dyed powerful greenish-blue shades.

If 6 parts of finely dispersed iron are used instead of cobalt there is obtained the corresponding sulfur-containing iron phthalocyanine which dyes cotton from the vat powerful olive-green shades. By replacing the cobalt by 12.5 parts of zinc powder the corresponding sulfur-containing zinc phthalocyanine is obtained.

What I claim is:

1. A process of producing sulfur-containing phthalocyanine dyestuffs which comprises heating in relative proportions about 4 moles of a phthalocyanine-forming compound selected from the class consisting of phthalodinitriles, ortho-cyano-benzoic acid amides and phthalic acid diamides with about 1 to 24 gram atoms of sulfur and about 1 mole of a member selected from the class consisting of cobalt, iron, and zinc metallizing agents at from 150° C. to 220° C.

2. A process of producing sulfur-containing phthalocyanine dyestuffs which comprises heating in relative proportions about 4 moles of ortho-cyano-benzoic acid amide with from about 1 to 24 gram atoms of sulfur and about 1 mole of a cobalt metallizing agent at from 150° C. to 220° C.

3. A process of producing sulfur-containing phthalocyanine dyestuffs which comprises heating in realtive proportions about 4 moles of phthalic acid diamide with from about 1 to 24 gram atoms of sulfur and about 1 mole of a cobalt metallizing agent at from 150° C. to 220° C.

4. A process of producing sulfur-containing phthalocyanine dyestuffs which comprises heating in relative proportions about 4 moles of phthalodinitrile with from about 2 to 4 gram atoms of sulfur and about 1 mole of an inorganic cobalt salt at from 150° to 220° C.

5. A process of producing sulfur-containing phthalocyanine dyestuffs which comprises heating in relative proportions about 4 moles of phthalodinitrile with from about 1 to 24 gram atoms of sulfur and about 1 mole of a cobalt metallizing agent at from 150° C. to 220° C.

6. A cobalt phthalocyanine containing from 1 to 2 atoms of sulfur in chemical combination prepared according to the process as claimed in claim 2, said cobalt phthalocyanine dyeing vegetable fibers from an alkaline sodium hyposulphite vat.

7. A heavy metal phthalocyanine containing from 1 to 2 atoms of sulfur in chemical combination prepared according to the process as claimed in claim 1, said phthalocyanines dyeing vegetable fibers from an alkaline sodium hyposulphite vat.

8. A cobalt phthalocyanine containing from 1 to 2 atoms of sulfur in chemical combination prepared according to the process as claimed in claim 5, said cobalt phthalocyanine dyeing vegetable fibers from an alkaline sodium hyposulphite vat.

9. A cobalt phthalocyanine containing from 1 to 2 atoms of sulfur in chemical combination prepared according to the process as claimed in claim 3, said cobalt phthalocyanine dyeing vegetable fibers from an alkaline sodium hyposulphite vat.

References Cited in the file of this patent

UNITED STATES PATENTS

| | | |
|---|---|---|
| 2,202,632 | Heilbron | May 28, 1940 |
| 2,453,953 | Wood | Nov. 16, 1948 |

OTHER REFERENCES

Linstead: Jour. Chem. Soc. (London), 1934, pp. 1030.

Mellor's Modern Inorganic Chemistry, Revised Edition, Parkes and Mellor, p. 594, Longmans, Green and Co., New York (1946).